United States Patent
Caro Suarez et al.

(10) Patent No.: US 11,001,152 B2
(45) Date of Patent: May 11, 2021

(54) POWERTRAIN ARCHITECTURES AND CONTROL ALGORITHMS FOR INTELLIGENT ELECTRIC SCOOTERS

(71) Applicant: GM Global Technology Operations LLC, Detroit, MI (US)

(72) Inventors: Carlos E. Caro Suarez, Warren, MI (US); Brian V. Castillo, Birmingham, MI (US); Sandra N. Thomson, Bloomfield Hills, MI (US); Bradly LaBaere, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 16/142,415

(22) Filed: Sep. 26, 2018

(65) Prior Publication Data
US 2020/0094693 A1    Mar. 26, 2020

(51) Int. Cl.
*B60L 15/20* (2006.01)
*B62K 5/027* (2013.01)
(Continued)

(52) U.S. Cl.
CPC .............. *B60L 15/20* (2013.01); *B62K 5/027* (2013.01); *B62K 5/05* (2013.01); *B62K 7/04* (2013.01);
(Continued)

(58) Field of Classification Search
CPC ........... B60L 50/20; B62K 5/027; B62K 5/05; B62K 7/04; F16D 41/24; Y02T 10/64
See application file for complete search history.

(56) References Cited

U.S. PATENT DOCUMENTS

| | | |
|---|---|---|
| 3,921,741 A | 11/1975 | Garfinkle et al. |
| 5,878,831 A | 3/1999 | Saito et al. |

(Continued)

FOREIGN PATENT DOCUMENTS

DE    102017205416 A1 * 10/2018 ............. B62M 6/50

OTHER PUBLICATIONS

Andre Hodder et. al., "A New Electrically Assist Scooter", 2008, IEEE 2008 18th International Conference on Electrical Machines (Year: 2008).*

(Continued)

*Primary Examiner* — Anshul Sood
(74) *Attorney, Agent, or Firm* — Quinn IP Law (57) ABSTRACT

Presented are adaptive propulsion assist systems and control logic for manually-powered vehicles, methods for making/using such systems, and intelligent electric scooters with distributed sensing and control-loop feedback for adaptive e-assist operations. A method for regulating a propulsion assist system of a manually-powered vehicle includes a vehicle controller detecting a user contacting the vehicle's handlebar, responsively receiving sensor signals indicative of a user-applied force to the handlebar, and then determining a net user-applied force based on the handlebar force and user-generated forces applied to the scooter deck. The vehicle controller also receives sensor signals indicative of the vehicle's current acceleration, and determines therefrom a pitch angle of the surface on which the vehicle moves. Responsive to the net force being greater than zero and the pitch angle being greater than a calibrated threshold angle, the controller commands the traction motor to increase motor torque output by a calibrated force gain increment.

20 Claims, 4 Drawing Sheets

(51) Int. Cl.
*B62K 5/05* (2013.01)
*B62K 7/04* (2006.01)

(52) U.S. Cl.
CPC ....... *B60L 2240/12* (2013.01); *B60L 2240/16* (2013.01); *B60L 2240/18* (2013.01); *B60L 2240/423* (2013.01); *B60L 2250/24* (2013.01)

(56) References Cited

U.S. PATENT DOCUMENTS

| | | | |
|---|---|---|---|
| 6,367,833 B1 | 4/2002 | Horiuchi | |
| 6,580,188 B2 | 6/2003 | Katagiri et al. | |
| 6,629,574 B2 | 10/2003 | Turner | |
| 7,463,953 B1 * | 12/2008 | Lee | B60W 40/12 701/1 |
| 8,183,726 B2 | 5/2012 | Rittenhouse | |
| D735,812 S | 8/2015 | Delgatty | |
| 9,108,700 B2 | 8/2015 | Chen et al. | |
| 9,168,965 B2 | 10/2015 | Lovley, II et al. | |
| 9,252,603 B2 | 2/2016 | Shim | |
| 9,771,124 B2 | 9/2017 | Seagraves et al. | |
| 9,840,305 B1 | 12/2017 | Tsuchizawa et al. | |
| 9,857,252 B2 | 1/2018 | Murugesan et al. | |
| 2001/0011202 A1 * | 8/2001 | Yamawaki | B62M 6/45 701/93 |
| 2007/0107963 A1 | 5/2007 | Chiu | |
| 2008/0177433 A1 | 7/2008 | Teo et al. | |
| 2009/0102408 A1 | 4/2009 | De Jesus et al. | |
| 2011/0024217 A1 | 2/2011 | Sluijter et al. | |
| 2011/0160945 A1 | 6/2011 | Gale | |
| 2011/0215548 A1 | 9/2011 | Horwat, Jr. | |
| 2012/0202649 A1 | 8/2012 | Huber | |
| 2013/0179016 A1 | 7/2013 | Gale | |
| 2016/0121963 A1 * | 5/2016 | Tanaka | B60L 58/12 701/22 |
| 2016/0304157 A1 | 10/2016 | Craven et al. | |
| 2017/0144724 A1 * | 5/2017 | Murugesan | B62M 6/45 |
| 2017/0313380 A1 * | 11/2017 | Corno | B62M 6/50 |
| 2018/0170212 A1 * | 6/2018 | Liu | B62M 6/50 |
| 2018/0281838 A1 * | 10/2018 | Andersson | B62B 9/00 |
| 2019/0047554 A1 * | 2/2019 | Vaughn | B60W 10/20 |
| 2019/0308690 A1 * | 10/2019 | Terashima | B62M 25/08 |
| 2019/0315433 A1 * | 10/2019 | Hasumi | B60L 50/20 |

OTHER PUBLICATIONS

Kristofferson Reyes, et. al., "Adaptive Speed and Power Control for a Pedelec Using an ARM Cortex-M0 Microcontroller", Nov. 2017, 5th DLSU Innovation and Technology Fair 2017 (Year: 2017).*
Motorized Scooter Background Information, Sep. 2018, USA.

* cited by examiner

POWERTRAIN ARCHITECTURES AND CONTROL ALGORITHMS FOR INTELLIGENT ELECTRIC SCOOTERS

INTRODUCTION

The present disclosure relates generally to motor-assisted, manually powered vehicles. More specifically, aspects of this disclosure relate to propulsion assist systems and attendant control logic for stand-up type electric scooters.

Many vehicles that have traditionally been powered by the vehicle's operator—be it hand-powered or foot-powered designs—may now be originally equipped with or retrofit to include a traction motor for assisting with propelling the vehicle. The traction motor, which may take on the form of an internal combustion engine (ICE) or an electric motor, generally propels the vehicle in either an assisted or an unassisted capacity, i.e., with or without manually generated tractive force. For instance, a stand-up type electric scooter (colloquially referred to as an "electric kick scooter" or "E-scooter") is equipped with an on-board electric motor for providing supplemental tractive torque that assists or "boosts" a rider's foot-generated tractive power. The traction motor operates alone or in conjunction with a power transmission to rotate a driven member of the E-scooter, such as a wheel hub or axle shaft. Output torque from the motor may be selectively delivered to the driven member, e.g., when the rider negotiates a road surface with a pronounced gradient along a travel route. In this manner, the rider's perceived manual effort needed to propel the vehicle may be reduced when riding an E-scooter relative to the perceived effort on a standard scooter lacking an electrical assist (e-assist) function.

SUMMARY

Disclosed herein are adaptive propulsion assist systems and attendant control logic for manually powered vehicles, methods for operating and methods for constructing such adaptive propulsion assist systems, and intelligent electric scooters with distributed sensing and control-loop feedback for adaptive propulsion assist operations. By way of example, there are presented novel intelligent electric scooter architectures that employ an electric traction motor and an onboard traction battery pack for transporting users and cargo. Using a mid-mount, transverse motor layout, the electric traction motor is connected via a power-split differential to the axle halfshafts of the scooter's ground wheels. Force sensors placed in the scooter deck and handlebars are used to regulate motor output. Offering an electrified alternative to conventional push carts and stand-up kick scooters of this form factor, disclosed intelligent electric scooters provide multi-modal operation and tight turn angles for effective maneuvering. Disclosed architectures may serve as a base platform for numerous electrified mobility solutions, such as electric kick scooters, cargo carts, strollers, wheelchairs, shopping carts, golf caddies, etc. In addition to providing cross-platform flexibility, these electric scooter architectures are readily scalable to accommodate different sized payloads and distinct work environments.

Also presented herein are control algorithms for governing operation of electric scooter powertrains to provision vehicle load assist, surface grade compensation, and friction compensation capabilities. Using a combination of force sensors, a tri-axial accelerometer, a tachometer, and an in-vehicle microcontroller, the control algorithm is able to ascertain a vehicle speed, a user-applied input force, and a pitch angle to adjust one or more powertrain parameters to maintain a steady vehicle speed and facilitate measured movement of large payloads. Automated cruise control is enabled through a human machine interface (HMI) that functions to determine a user's desired movement from the distributed network of sensors, eliminating the need for dedicated switches, pedals, pushbuttons, etc. Foot and handlebar force sensors, for example, are used to control power e-assist, while an inertial measurement unit (IMU) works in cooperation with the foot and handlebar force sensors to enable grade compensation. Through these control techniques, an intelligent electric scooter is able to move heavy payloads, reduce unwanted deceleration caused by friction and grade, and vary motor power output to compensate for steep incline/decline angles. In addition, by implementing protocols that help the scooter understand its surroundings, the intelligent electronic scooter is able to automatically adapt motor output and vehicle speed as a function of user input and environment values.

Aspects of this disclosure are directed to adaptive propulsion assist techniques and computer-executable algorithms for operating motor-assisted, human-powered vehicles. For instance, a method is presented for regulating a propulsion assist system of a manually powered vehicle. The manually powered vehicle includes a rigid frame, a handlebar, and multiple ground wheels rotatably mounted to the frame. The propulsion assist system includes an electric or combustion-based traction motor that is securely mounted to the frame and operable to drive one or more of the ground wheels. A resident vehicle controller is mounted to the vehicle frame and governs output of the traction motor. This representative method includes, in any order and in any combination with any of the above and below disclosed options and features: detecting, e.g., via the vehicle controller through cooperative operation with a capacitive touch sensor mounted to the handlebar, a user contacting the manually powered vehicle; responsive to detecting user contact with the vehicle, receiving, e.g., via the vehicle controller from a rotary potentiometer or a force sensor attached to the handlebar, one or more sensor signals indicative of a force applied by the user to the handlebar; determining a net force applied by the user to the manually powered vehicle based, at least in part, on the handlebar force; receiving, e.g., via the vehicle controller from a single or multi-axis accelerometer mounted to the frame, one or more sensor signals indicative of the vehicle's current acceleration; determining a pitch angle of the surface upon which the manually powered vehicle is moving based on the vehicle's acceleration; and, responsive to the net force being greater than zero and the pitch angle being greater than a calibrated threshold angle, the vehicle controller transmits one or more command signals to the traction motor to increase motor torque output by a calibrated force gain increment.

Other aspects of the present disclosure are directed to adaptive propulsion assist systems for intelligent human-powered vehicles. As used herein, the term "vehicle" and permutations thereof may include any relevant motorized vehicle platform that is powered predominantly by a human, such as motor-assisted scooters, carts, strollers, cycles, cargo pallets and dollies, etc. In an example, an intelligent electric scooter is presented that includes a rigid vehicle frame with an elongated scooter deck that provides subjacent support for a standing user. A handlebar, e.g., with one or more handles and a corresponding number of hand brake assemblies, is movably mounted to the vehicle frame and configured to be manually operated by the user. Multiple ground wheels, a traction battery pack, and a traction motor are also operatively attached to the vehicle frame. The traction motor is electrically connected to the traction battery pack and is operable to selectively impart assist torque to drive one or more of the ground wheels. The electric scooter's powertrain may optionally include a power-split differential that connects the traction motor to a pair of axle halfshafts for driving left-hand and right-hand side wheels.

Continuing with the discussion of the above example, the resident vehicle controller, which is wired or wirelessly connected to the traction motor and other onboard electrical hardware, is programmed to execute various memory stored instructions. For instance, the vehicle controller detects user contact with the electric scooter and, responsive to the detected user contact, receives one or more sensor signals from a force sensor attached to the handlebar. These handlebar sensor signals are indicative of a user-generated force applied to the handlebar, e.g., to initiate or discontinue e-assist. From the measured forces applied to the handlebar and, in some applications, to the scooter deck, the vehicle controller determines a net force applied by the user to the electric scooter. The controller also receives one or more sensor signals from an accelerometer that is mounted to the scooter's rigid frame. These accelerometer-generated sensor signals are indicative of the electric scooter's fore-aft, transverse, and/or vertical acceleration. Using this acceleration data, the controller determines a pitch angle of the surface upon which the electric scooter is travelling. In response to the net force being greater than zero and the pitch angle being greater than a calibrated threshold angle, the vehicle controller transmits one or more command signals to the traction motor to increase motor torque output by a calibrated force gain increment.

For any of the disclosed systems, methods, and vehicles, detecting user contact with the manually powered vehicle may include the vehicle controller receiving one or more sensor signals from a contact sensor that is mounted to a handle of the handlebar. In this regard, the vehicle controller may respond to detecting user contact with the vehicle by receiving one or more sensor signals from a force sensor mounted to the scooter deck. These deck sensor signals are indicative of a user-generated force applied to the scooter deck, e.g., while standing on the deck and pushing off the ground to propel the scooter. In this instance, the calculated net force is based on both the sensor-measured deck force and handlebar force. For at least some embodiments, the accelerometer is a multi-axis accelerometer of an inertial measurement unit (IMU) that is mounted to the frame. In this instance, the accelerometer may generate sensor signals indicative of a vertical (upward-downward) acceleration component, a longitudinal (fore-aft) horizontal acceleration component, and a lateral (starboard-port) horizontal acceleration component. These three acceleration components are mutually orthogonal, e.g., as part of a fixed reference coordinate system.

For any of the disclosed systems, methods, and vehicles, the vehicle controller may respond to not detecting a user contacting the manually powered vehicle by transmitting one or more stop command signals to the traction motor to discontinue outputting motor torque. As another option, the vehicle controller may receive one or more user-generated brake signals from a brake input device to stop the manually powered vehicle. In response to these brake commands, the controller responsively transmits one or more stop command signals to the traction motor to discontinue outputting motor torque. For either of the foregoing options, a stop command signal may be accompanied by a brake activation signal transmitted via the vehicle controller to a brake system that actively slows one or more of the ground wheels.

For any of the disclosed systems, methods, and vehicles, the vehicle controller may respond to the net user-applied force being less than or equal to zero by determining the vehicle's current speed and concomitantly determining if the current vehicle speed is less than a preset cruise speed (e.g., as part of a friction compensation mode). If the vehicle's current speed is less than the preset cruise speed, the controller responsively transmits one or more boost command signals to the traction motor to increase motor torque output by a Proportional-Integral (PI) control value. In addition, the vehicle controller may respond to the current vehicle speed being greater than the preset cruise speed by transmitting one or more cut command signals to the traction motor to decrease motor torque output by the PI control value. In at least some applications, a boost/cut command signal may require the vehicle's current speed be less/greater than the preset cruise speed by at least a calibrated minimum value/percent.

For any of the disclosed systems, methods, and vehicles, the vehicle controller may respond to the surface's pitch angle being less than a second calibrated threshold angle by: determining a force component due to the pitch angle; determining if a difference between the net force and the force component is greater than zero; and, responsive to the difference between the net force and force component being greater than zero, commanding the traction motor to increase motor torque output by the calibrated force gain increment. If the difference between the net force and the force component is not greater than zero, the vehicle controller may respond by: determining the vehicle's current speed; determining if the current vehicle speed is less than a preset cruise speed; and, responsive to the current vehicle speed being less than the preset cruise speed, transmitting one or more boost command signals to the traction motor to increase motor torque output by a PI control value.

For any of the disclosed systems, methods, and vehicles, after transmitting a command signal to increase motor torque output, the vehicle controller may measure a resultant vector quantity from a shear force and a handlebar force applied to the manually powered vehicle and, concomitantly, determine if this resultant is greater than zero. In response to the resultant vector quantity being greater than zero, the controller determines if the vehicle's current speed is greater than a preset cruise speed. If so, the adaptive motor-assist system will responsively modify the vehicle's memory-stored preset cruise speed to more closely align with vehicle speed. When modulating motor torque output by a calibrated force gain, the vehicle controller may be programmed to retrieve such calibrated force gain increments from a memory-stored look-up table that correlates pitch angle to force gain.

For any of the disclosed systems, methods, and vehicles, determining the pitch angle may include: calculating an initial angle as an atan 2 function of the vehicle's vertical and horizontal acceleration components; determining a delta angle from an angular velocity of the manually powered vehicle about a pitch axis horizontal relative to the surface on which the manually powered vehicle moves and orthogonal relative to a direction of travel of the manually powered vehicle; and calculating the pitch angle as a mathematical difference or sum between the initial angle and the delta angle. Alternatively, determining the pitch angle may include: calculating an initial angle as an absolute value of an arccos function of the vertical acceleration component and gravity; determining a force direction of the net force applied by the user to the manually powered vehicle; and determining the pitch angle by assigning a pitch angle sign to the absolute value of the initial angle based on the force direction.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these examples are provided as a representation of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward driving direction of a motor-assisted, human-powered vehicle when the vehicle is operatively oriented on a planar surface.

Figure 1:
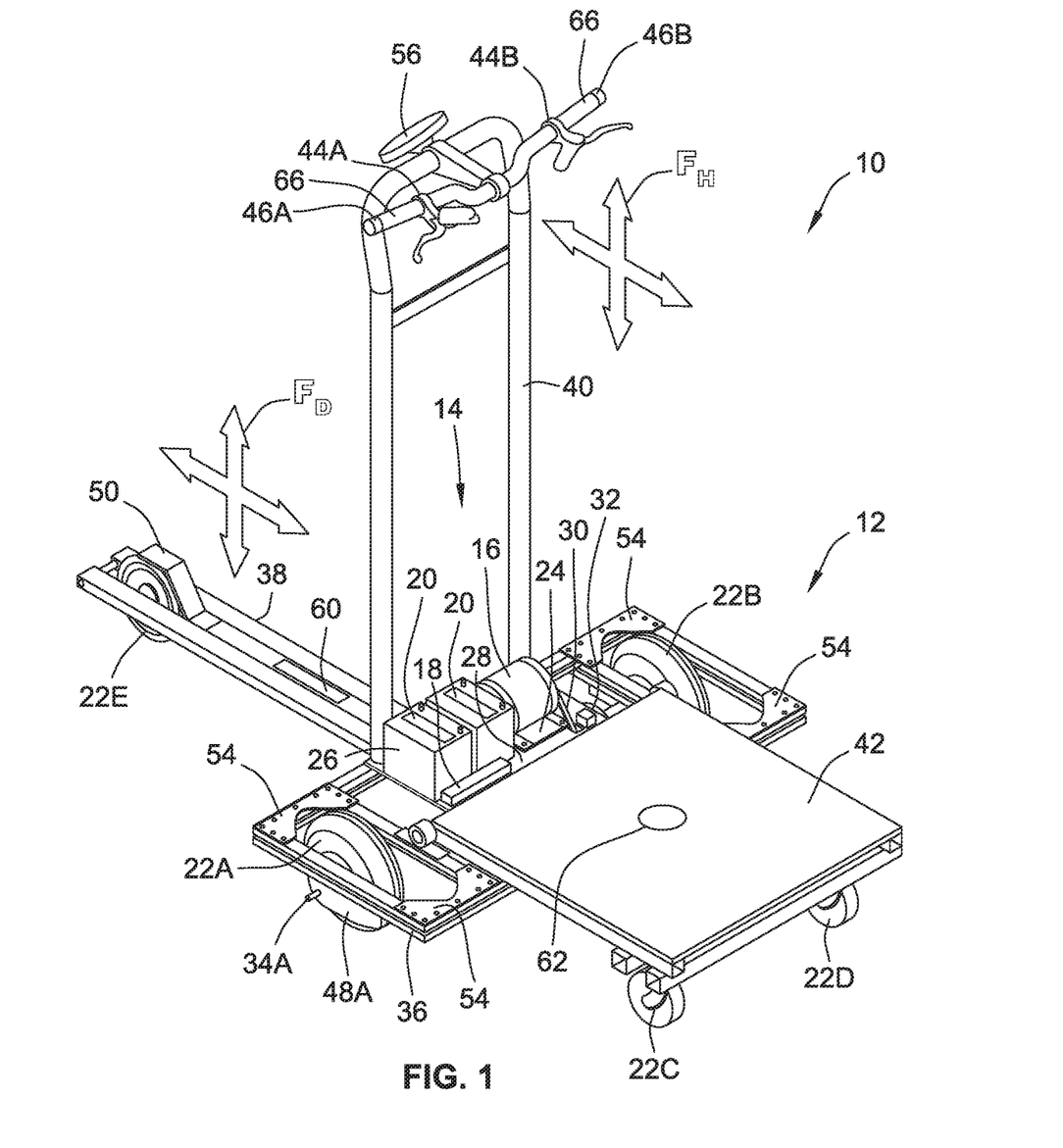
FIG. 1 is a front, perspective-view illustration of a representative motor-assisted, human-powered vehicle having adaptive propulsion assist capabilities in accordance with aspects of the present disclosure.

Referring now to the drawings, wherein like reference numbers refer to like features throughout the several views, there is shown in FIG. 1 a representative motor-assisted, human-powered vehicle, which is designated generally at 10 and portrayed herein for purposes of discussion as a stand-up type electric scooter with forward cargo bed. Distributed throughout the electric scooter 10, e.g., packaged at different locations on a vehicle chassis 12, is an adaptive propulsion assist system 14 that provides supplemental torque for propelling the electric scooter 10. The illustrated motor-assisted, human-powered vehicle 10—also referred to herein as "manually powered vehicle" or "vehicle" for brevity—is merely an exemplary application with which aspects and features of this disclosure may be practiced. In the same vein, implementation of the present concepts for the specific powertrain architecture discussed below should also be appreciated as an exemplary application of the novel features disclosed herein. As such, it will be understood that aspects and features of this disclosure may be applied to other power assist systems, and may be implemented for any logically relevant type of manually powered vehicle. Lastly, the drawings presented herein are not necessarily to scale and are provided purely for instructional purposes. Thus, the specific and relative dimensions shown in the drawings are not to be construed as limiting.

Adaptive propulsion assist system 14 of FIG. 1 is generally composed of a traction motor 16 that communicates with and, at the same time, is governed by a resident vehicle controller 18, both of which are securely mounted onto the rigid vehicle chassis 12. According to the illustrated example, the traction motor 16 is a transverse-mounted, multi-phase electric motor/generator unit (MGU) that is powered by a pair of rechargeable traction battery modules 20 (collectively defining a "traction battery pack"). These traction battery modules 20 store energy that can be used to power the onboard vehicle electronics and to power the MGU 16 for selectively driving right-hand (starboard) and left-hand (port) ground wheel units 22A and 22B, respectively. For at least some applications, the traction motor 16 and battery packs 20 are affixed by a mounting bracket 24 and battery cases 26, respectively, to a mounting plate 28 of the vehicle chassis 12. An optional outer housing (removed from the Figures for ease of reference to the underlying components) may cover and protect the motor 16, battery modules 20, and any attendant peripheral hardware. Traction battery modules 20 may take on many suitable configurations, including a stack of lead-acid, lithium-ion, or lithiumpolymer cells, or other applicable type of high-voltage, high ampere-hour capacity, direct current (DC) electric vehicle battery (EVB).

To impart motive power to the vehicle 10, the traction motor 16 is drivingly coupled to the two lateral wheel units 22A, 22B through a suitable power transmission, such as a belt-drive or a chain-drive transmission 30. The vehicle's final drive system employs a split-power differential gear train 32 (more commonly referred to as a "differential") that apportions motor-generated torque and power between the wheel units 22A, 22B. Each of two axle shafts 34A (FIG. 1) and 34B (FIG. 2) is operatively connected at one end thereof, e.g., via splined engagement, to the differential 32 and at the opposite end thereof, e.g., via a shaft coupler, to a respective one of the ground wheel units 22A, 22B. While shown as a mid-mount, transverse motor layout, the traction motor 16 may be reoriented or repositioned to other locations of the vehicle chassis 12 and drivingly connected to any or all of the ground wheels 22A-22E, e.g., to provide a front-wheel drive (FWD), rear-wheel drive (RWD), four-wheel drive (4WD), or all-wheel drive (AWD) drivetrain configuration. For instance, alternative power assist architectures may drivingly connect the traction motor 16 to the caster-type front wheel units 22C and 22D—a FWD drivetrain—or, if desired, to a non-swivel rear wheel unit 22E—a RWD drivetrain—to provide driving power for propulsion of the vehicle 10. It is further envisioned that the vehicle 10 employ other prime movers for supplemental propulsion, including an internal combustion engine (ICE) assembly or a hybrid powertrain that employs both an electric machine and a combustion engine.

With continuing reference to FIG. 1, the traction motor 16 is electrically connected to and energized by the traction battery modules 20 to propel the vehicle 10 in either an unassisted "motor-only" propulsion mode or an assisted "motor-rider" propulsion mode. Resident vehicle controller 18 is programmed to receive and process various user-input signals, sensor signals, and wireless data exchanges, and respond to these inputs by modulating output of the traction motor 16 via one or more motor control signals. During the assisted operating mode, the traction motor 16 outputs an "e-assist" torque at a level sufficient to augment or "boost" user-generated torque while still satisfying, to the extent possible, one or more desired e-assist objectives of a user. Conversely, when functioning in an unassisted operating mode, the traction motor 16 outputs a motive torque that is sufficient to temporarily propel the vehicle 10 without a kicking-gait motion from the rider to push the vehicle 10. In this manner, the resident vehicle controller 18 may automatically allocate electrical energy from the traction battery modules 20 to the traction motor 16 in real-time and, thus, reserves and optimizes e-assist functions in real-time while the vehicle 10 negotiates a travel route.

Figure 2:
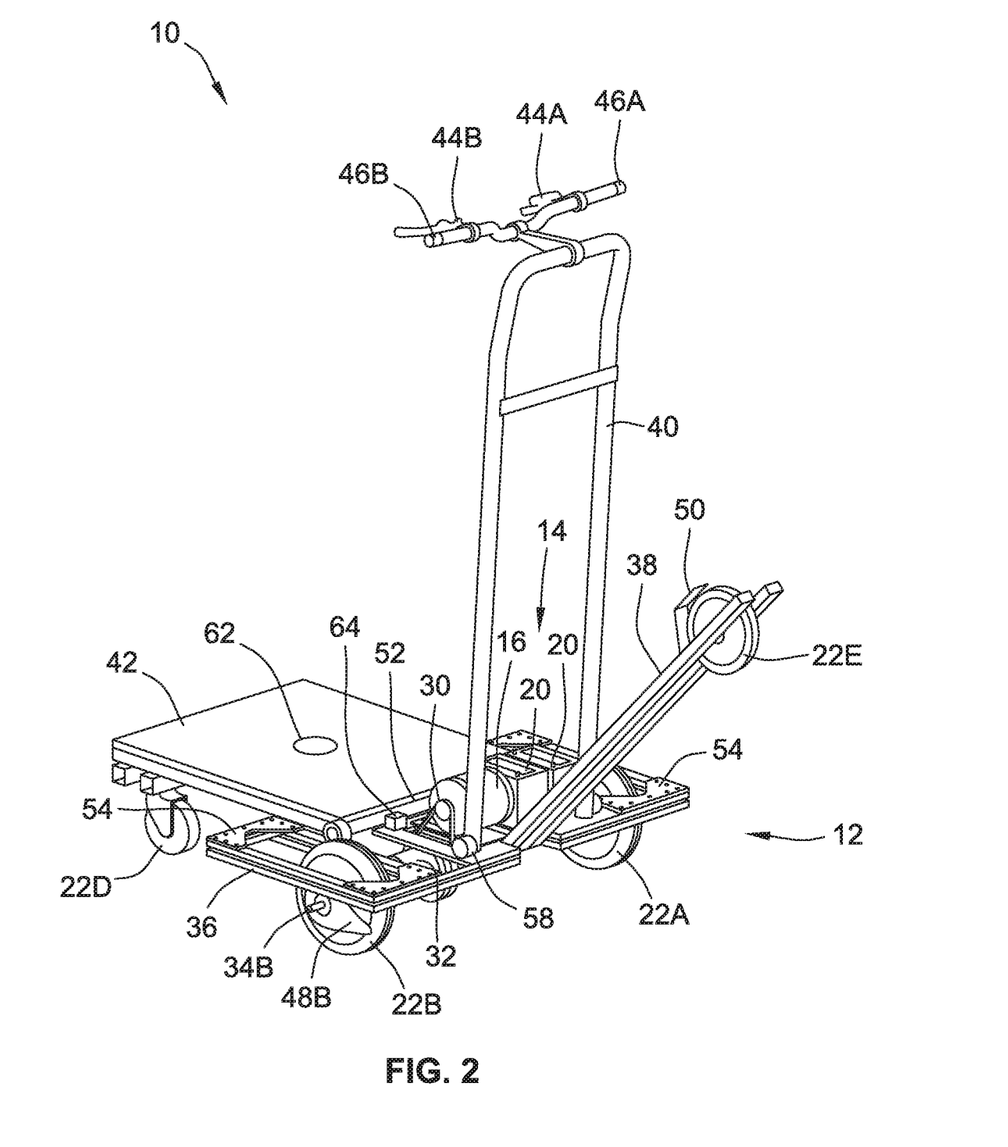
FIG. 2 is a rear, perspective-view illustration of the representative motor-assisted, human-powered vehicle of FIG. 1.

Electric scooter 10 of FIG. 1 may take on a variety of different scooter, cart, and hybrid-body configurations, including trike, quadracycle, and pentacycle designs, that incorporate a cargo bed, basket, bin, or other loadbearing structure for transporting cargo. By way of non-limiting example, the representative vehicle 10 is portrayed as a five-wheel electric cargo scooter with a vehicle chassis 12 that is fabricated with a box-type support frame 36, a wheeled scooter deck 38, an upright handlebar set 40, and a forward cargo bed 42. Scooter deck 38 projects rearwardly from the box-type frame 36 for supporting thereon a standing rider (not shown). It is envisioned that the scooter deck 38 may be rigidly secured to the frame 36, e.g., via rivets, fasteners, or welds, or may be eliminated from the vehicle 10 architecture altogether, e.g., for a cart, caddy or stroller design. In accord with the illustrated example, scooter deck 38 of FIGS. 1 and 2 is shown movably mounted to the frame 36 to transition back-and-forth between a generally horizontal "deployed" position and a generally vertical "stowed" position. Vehicle 10 may also utilize a pivoting coupler joint that allows the scooter deck 38 to pivot in both a pitching motion, e.g., about a transverse axis, as well as a yawing motion, e.g., about a vertical axis. Frame 36, scooter deck 38, handlebar set 40, and cargo bed 42 may each be manufactured from a rigid metallic material, such as 80/20 aluminum, a high-strength polymer, such as rigid polyvinyl chloride (RPVC), or a combination of suitably rigid, rust resistant materials.

Handlebar set 40 projects upwardly from the box-type support frame 36 and allows the rider to manually control the heading and directional changes of the vehicle 10, as will be described in further detail below. Right-hand and left-hand brake lever assemblies 44A and 44B, respectively, are mounted on the handlebar set 40 adjacent respective handle grips 46A and 46B. These brake lever assemblies 44A, 44B allow the user to selectively slow and stop the vehicle 10 by actuating right-side and left-side drum brake assemblies 48A (FIG. 1) and 48B (FIG. 2). An optional foot brake 50 attached in proximity to a rearward end of the scooter deck 38 is designed to be pressed down by a user's foot to frictionally engage and thereby slow the rear wheel unit 22E. Located at the front of the vehicle 10, forward cargo bed 42 provides a rigid work surface for seating thereon and supporting a cargo payload. Although not shown, the cargo bed 42 may incorporate guard rails, a basket, or a container to provide additional retention and protection while transporting payloads placed on the vehicle 10. A slide-attachment bracket 52 mechanically couples the rearward-most end of the cargo bed 42 to the frame 36 and allows for adjustable repositioning of the cargo bed 42. Optional support plates 54 may be mounted to the frame 36 fore and aft of the left-hand and right-hand ground wheel units 22A and 22B.

For at least some applications, the vehicle 10 may be optionally equipped with regenerative charging capabilities that enable the traction battery modules 20 to be recharged during operation of the vehicle 10. When the vehicle 10 is on a decline, for example, the ground wheel units 22A, 22B may normally freewheel while gravity provisionally provides the motive force that propels the vehicle 10. Alternatively, the resident vehicle controller 18 may switch the traction motor 16 from a motoring mode to a generator mode thereby allowing the motor 18 to produce electrical energy, e.g., by inducing electromagnetic induction through the motor's rotor and stator. To enable such a regenerative charging embodiment of the vehicle 10, the traction motor 16 may be equipped with the requisite power conditioning equipment, e.g., a power inverter, DC-DC converter, link capacitors, and/or other power filtering components, etc. Regenerative charging may also be enabled when the vehicle 10 is being propelled by the rider.

E-assist capabilities may be selectively provided by the traction motor 16 in response to motor control signals from the resident vehicle controller 18. Real-time interface of the rider with the resident vehicle controller 18 may be facilitated via a human machine interface (HMI) (i.e., touchscreen interactive display device 56) that is mounted onto the handlebar set 40 of the vehicle 10. Vehicle controller 18 may also exchange data with a fitness tracker device, such as a wearable electronic monitoring device (not shown), that is operable to measure the heart rate, caloric expenditure, perspiration, pedal rate, or any other such health-related and activity-related parameters of the rider. As another option, the rider may use a cellular-enabled smartphone, watch, or tablet computer to provide additional inputs to the resident vehicle controller 18, such as real-time vehicle location tracking, user preferences and milestones, historical assist level data, etc. Each of the resident vehicle controller 18, wearable electronic device, and/or smartphone/tablet/watch may communicate wirelessly with one another and with one or more remote computing nodes, such as a cloud computing resource service or a backend or middleware server computing node. Communication capabilities with remote, off-board networked devices may be provided via a cellular chipset/component, a wireless modem, a navigation and location chipset/component (e.g., GPS transceiver), a short-range wireless communication device (e.g., a Bluetooth® unit or near field communications (NFC) transceiver), a dual antenna, or any suitable means of wireless communication.

As indicated above, resident vehicle controller 18 is constructed and programmed to govern, among other things, operation of the traction motor 16. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both. The vehicle controller 18 may execute one or more software or firmware programs or routines, combinational logic circuit(s), input/output circuit(s) and devices, and include appropriate signal conditioning and buffer circuitry, and other components to provide the described functionality. Software, firmware, programs, instructions, routines, code, algorithms and similar terms may mean any controller executable instruction sets including calibrations and look-up tables. The controller may be designed with a set of control routines executed to provide desired functions. Control routines are executed, such as by a central processing unit, and are operable to monitor inputs from sensing devices and other networked control modules, to execute control and diagnostic routines for controlling operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of calibrated events during operation of the vehicle 10.

The unique vehicle architecture presented in FIGS. 1 and 2 allows the motor-assisted, human-powered vehicle 10 to be used in at least three different motor-assisted/unassisted configurations: (1) a "walk-behind" configuration; (2) a "ride-behind" configuration; and (3) a "dual-mode" configuration. The walk-behind configuration may be typified as a cart or stroller-type arrangement where the scooter deck 38 is removed or stored such that the user's gate is unimpeded while pushing the vehicle 10. Comparatively, the ride-behind configuration may be exemplified as an e-scooter type arrangement where the rider stands on the scooter deck 38 while the vehicle 10 is propelled entirely by the traction motor 16. The dual mode configuration, by comparison, may be typified as a hybrid powertrain type arrangement that allows the user to stand on the scooter deck 38 and cooperate with the motor 16 to contemporaneously propel the vehicle 10. To this end, the illustrated vehicle architecture may serve as a platform for a multitude of electrified mobility solutions, such as a cargo scooter, electric stroller, commuter scooter, wheelchair, and any of the other options described herein.

All vehicle architecture variants may optionally provide a rider with three power-assist operating modes: (1) a mass-compensating "load assist" mode; (2) a motion-compensating "friction assist" mode; and (3) an incline-compensating "grade assist" mode, all of which are described in further detail below in the discussions of FIGS. 3 and 4. In order to supplement user-generated effort to move a heavy payload, load assist operations modulate motor output based, at least in part, on forces applied by the user to the scooter handle 40 and/or scooter deck 38. These forces may be measured by a first force sensor 58, such as rotary potentiometer or a linear variable differential transformer (LVDT), and a load sensor 62, such as a compression/shear force sensing pad. In an example, load assist increases motor output proportional to increases in user-generated force to the handlebars. Friction assist operations modulate motor output to prevent inadvertent speed reductions caused by surface friction, including variable surface friction ("mixed-mu") travel routes. By comparison, grade assist operations use control-loop feedback from a distributed array of in-vehicle sensors and accelerometers to determine surface incline/decline angle and thereby vary motor output to reduce excessive efforts and prevent unintended vehicle deceleration/acceleration on such inclines/declines. This distributed array of sensors may include any one or more or all of a first force sensor 58 operatively connected to the handlebar assembly 40, a second force sensor 60 (e.g., a polyurethane dielectric capacitive pressure sensor) operatively connected to the scooter deck 38, a load sensor 62 operatively connected to the cargo bed 42, an inertial measurement unit (IMU) 64 operatively connected to the mounting plate 28, and a pair of capacitive touch sensors 66 operatively connected to the handle grips 46A, 46B.

An optional adaptive cruise control feature governs motor output to help maintain vehicle speed at approximately the same speed as when the user is "scooting" the vehicle 10 without motor assistance. For instance, the resident vehicle controller 18 may track real-time speed of the vehicle 10 while e-assist is disabled; upon activation of e-assist, e.g., in response to a detected roadway incline, torque output of the traction motor 16 may be increased to an amount sufficient to maintain "post-assist" vehicle speed at the same "pre-assist" vehicle speed value. It is further envisioned that motor braking may be implemented to slow the vehicle 10 in instances where the adaptive cruise control wishes to reduce vehicle speed in order to continue "pre-assist" vehicle speeds.

In addition to activating the brake assemblies 48A, 48B, depression of either brake lever assembly 44A, 44B may also function to temporarily disable the motor 16. In the same vein, lack of contact between the user and vehicle 10, e.g., as sensed by the capacitive touch sensors 66 or force sensor 60, may likewise temporarily disable the motor 16. The foregoing features may help to allow a heavy vehicle (e.g., one with a heavy payload) to behave like a comparably lighter vehicle (e.g., one without a heavy payload). In addition, these features may help to enable vehicle control without throttle buttons or steering wheels, and may also help to promote greater vehicle control with auto stop features that prevent involuntary vehicle "runaway."

Figure 3:
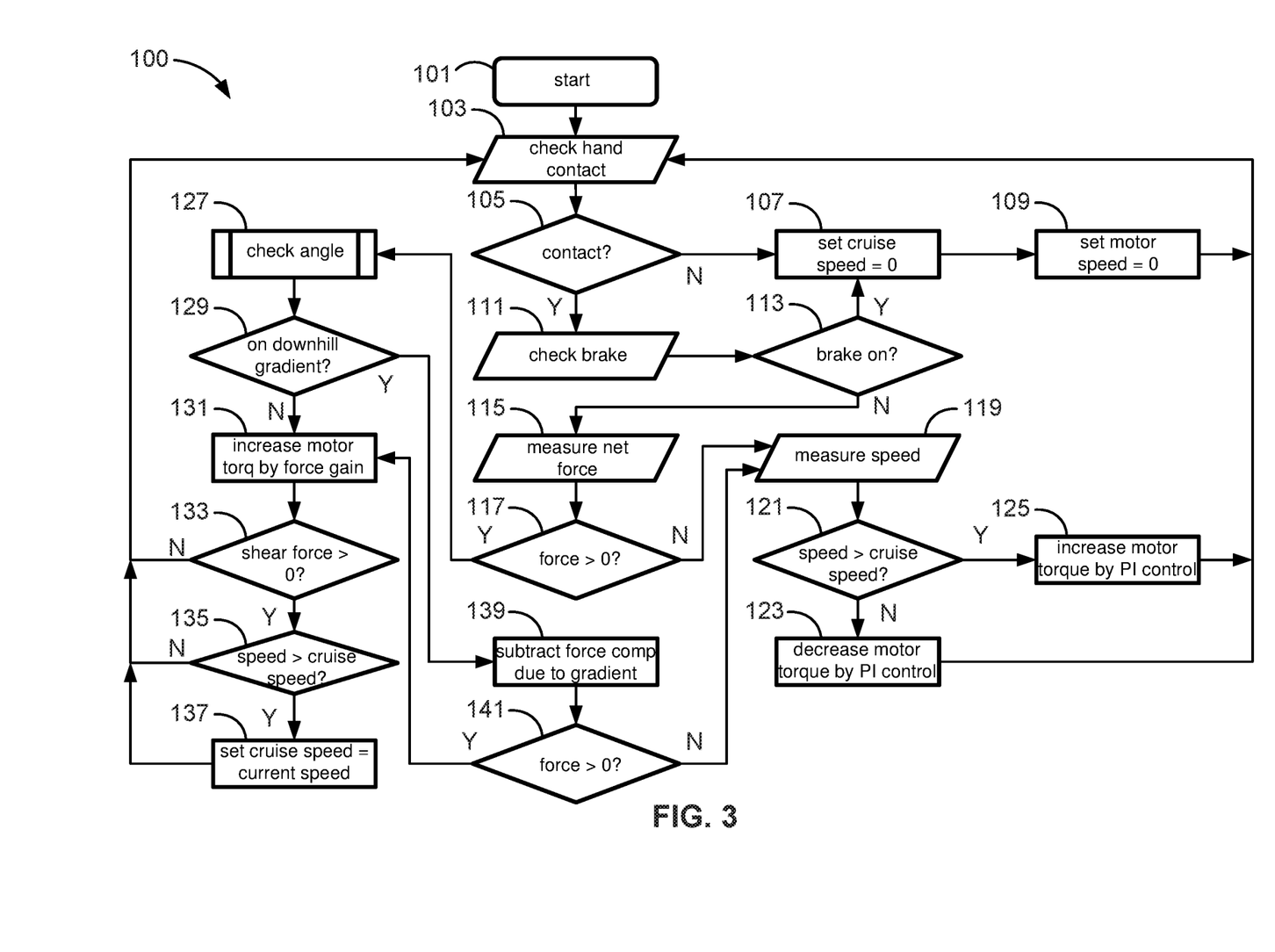
FIG. 3 is a flowchart illustrating a representative powertrain control algorithm for governing the e-assist power output of a traction motor, which may correspond to memory-stored instructions executed by onboard or remote control-logic circuitry, programmable electronic control unit, or other computer-based device or network of devices in accord with aspects of the disclosed concepts.

With reference now to the flowchart of FIG. 3, an improved method or control strategy for governing the power-assist output of a motor, such as traction motor 16, of a human-powered vehicle, such as electric scooter 10 of FIG. 1, is generally described at 100 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor to call up an initialization procedure for a real-time propulsion assist system control protocol that helps to improve e-assist output while optimizing system energy usage. This routine may be executed in real-time, continuously, systematically, sporadically and/or at regular intervals, for example, each 100 milliseconds, etc., during ongoing vehicle operation. As yet another option, terminal block 101 may initialize responsive to a command prompt from a user or a broadcast prompt signal from a backend or middleware computing node tasked with collecting, analyzing, sorting, storing and distributing vehicle data. As part of the initialization procedure at block 101, resident vehicle controller 18 may execute a navigation processing code segment, e.g., to obtain geospatial data, vehicle dynamics data, timestamp and related temporal data, etc.

Once system initialization is complete, the adaptive propulsion assist system 14 assesses whether or not a user is presently operating the vehicle 10. For instance, input/output block 103 may provide processor-executable instructions for the vehicle controller 18 to prompt one or more in-vehicle sensors to return sensor data indicative of a user contacting designated sections of the manually powered vehicle 10. As indicated above, user contact with the scooter deck 38 may be confirmed by the load sensor 62, while user contact with the handlebar set 40 may be confirmed by either capacitive touch sensor 66. Using the feedback sensor data retrieved at block 103, the vehicle controller 18 detects if a user is contacting the manually powered vehicle 10, at decision block 105. If a user is in fact not presently in contact with the vehicle 10 (block 105=NO), the system 14 may conclude that a user is not presently operating the vehicle 10 and respond by setting a memory-stored cruise speed equal to zero (0), at process block 107, and contemporaneously setting a memory-stored cruise speed equal to zero (0), at process block 109. Adaptive propulsion assist system 14 may thereafter return to input/output block 103 and loop back through method 100; alternatively, method 100 may temporarily terminate. In general, the memory-stored cruise speed is continuously adapted to align with the vehicle speed when operated by the user without motor assist; however, the cruise speed is set to zero and the motor disengaged by loss of user contact or user-initiated braking.

Upon determining that a user is presently in contact with one or more designated sections of the vehicle 10 (block 105=YES), the adaptive propulsion assist system 14 may conclude that a user is presently operating the vehicle 10 and, in response, assess whether or not the user desires the vehicle 10 be stopped. By way of example, and not limitation, method 100 continues to input/output block 111 with processor-executable instructions for the vehicle controller 18 to exchange data with the right-hand and/or left-hand brake lever assemblies 44A, 44B. Using the brake input signals received at block 111, the vehicle controller 18 detects if a user is applying either brake lever assembly 44A, 44B, as indicated at decision block 113. If a user is in fact depressing one or both brake lever assemblies 44A, 44B (block 113=YES), the system 14 may respond by setting the memory-stored cruise speed equal to zero (0), at process block 107, and contemporaneously setting the memory-stored motor speed equal to zero (0), at process block 109. Adaptive propulsion assist system 14 may thereafter temporarily terminate method 100 or may return to input/output block 103 and loop back through method 100.

After determining that a user is not depressing either of the brake lever assemblies 44A, 44B (block 113=NO), the method 100 continues to input/output block 115 to measure a current net force being applied by the user to the electric scooter 10. For this particular system operation, the resident vehicle controller 18 may exchange data with a first force sensor 58 (also referred to herein as "handlebar sensor") that is operatively attached to the handlebar set 40. The one or more sensor signals received from this force sensor 58 are indicative of a user-generated handlebar force $F_H$ (FIG. 1) being applied by the rider to the handlebar set 40, e.g., by pushing or pulling on the handle grips 46A, 46B while manually operating the vehicle 10. In instances where the scooter deck 38 is deployed and in use, the vehicle controller 18 may contemporaneously prompt a second force sensor 60 (also referred to herein as "deck sensor") mounted to the scooter deck 38 to return one or more signals indicative of a user-generated deck force $F_D$ (FIG. 1) being applied by the rider to the frame 36, e.g., by standing on the scooter deck 38 and pushing off the ground to propel the vehicle 10. The net force $F_{net}$ may be the vector sum (magnitude and direction) of the handlebar force $F_H$ and deck force $F_D$, or $F_{net}=F_H+F_D$.

At decision block 117, the method 100 determines if the net force applied by the user to the manually powered vehicle 10 is greater than zero (0). Responsive to a determination that the net force is in fact not greater than zero (block 117=NO), the method 100 proceeds to input/output block 119 to determine what is the current speed of the vehicle 10. Vehicle speed may be ascertained using any suitable technique, including Global Positioning System (GPS) generated geodetic datum, cellular trilateration, optical or magnetic wheel speed sensor, vehicle-to-infrastructure (V2I) data exchange, etc. Once a current vehicle speed is derived at block 119, the method 100 determines, at decision block 121, if the current vehicle speed is less than the memory-stored preset cruise speed. Responsive to the current vehicle speed being greater than the memory-stored preset cruise speed (block 121=NO), torque output of the traction motor 16 is decreased by a Proportional-Integral (PI) control value, at process block 123. Conversely, the resident vehicle controller 18 may respond to the current vehicle speed being less than the memory-stored preset cruise speed (block 121=YES) by increasing torque output of the traction motor 16 by a PI control value, at process block 125. The PI control gain may be determined in accordance with the PID algorithm 200 discussed below with respect to FIG. 4. A dedicated digital PI controller may be implemented with discrete sampling periods and a discrete form of a PI equation to approximate the integral value. Upon completion of process block 123/125, method 100 may temporarily terminate or loop back to input/output block 103.

Returning to decision block 117 of FIG. 3, the method 100 responds to the net user-applied force being greater than zero (block 117=YES) by advancing to predefined process block 127 to derive a pitch angle (grade) of the road or ground surface across which the manually powered vehicle 10 is moving. Surface grade may be expressed in several ways, an example of which is as an angle of inclination to horizontal (i.e., the plane perpendicular to a gradient of the gravity field at a given point). Continuing with the discussion of the representative application presented in FIGS. 1 and 2, the resident vehicle controller 18 communicates with the IMU 64 mounted to the vehicle chassis 12 to ascertain the vehicle's current acceleration. IMU 64 may be equipped with a triaxial accelerometer (not visible in the views provided) that generates sensor signals indicative of the electric scooter's current forward (fore-aft) horizontal acceleration component, transverse (starboard-port) horizontal acceleration component, and vertical (up-down) acceleration component. As will be explained in further detail below, the vehicle's pitch angle and, thus, the roadway grade of the subjacent support surface can be calculated, in whole or in part, from the scooter's measured acceleration.

After calculating the pitch angle at predefined process block 127, the method 100 transitions to decision block 129 to determine whether the vehicle 10 is on an inclined surface or a declined surface. For instance, resident vehicle controller 18 may ascertain: (1) is the pitch angle greater than a (first) calibrated incline threshold angle and, thus, the vehicle 10 is on an incline (return a negative "NO" response); or (2) is the pitch angle less than a (second) calibrated decline threshold angle and, thus, the vehicle 10 is on a decline (return a positive "YES" response). These threshold values may be calibrated to each vehicle make and model to ensure grade compensation is only initiated for non-negligible inclines/declines. Upon determining that the pitch angle is greater than the first calibrated threshold angle (block 129=NO), system 14 concludes that the vehicle 10 is on a not-insubstantial incline and the method 100 proceeds to process block 131 with memory-stored instructions for the vehicle controller 18 to disseminate one or more command signals to the traction motor 16 to increase motor torque output by at least a calibrated force gain increment. This calibrated force gain increment can be retrieved by the vehicle controller 18 from a memory-stored look-up table that correlates pitch angle to force gain. Each gain table may contain vehicle-specific calibration data that relates a series of surface pitch angles (from 0° to 50° in 50 increments) to a complementary series of gain values (a respective motor force gain increment for each increment) to achieve a specified motor output. As an example, a gain table includes progressively increasing gain values by which the motor output is increased to offset progressively increasing roadway gradients. A gain table may further highlight a maximum motor output that the vehicle achieves for each gain value.

Once motor torque output is increased at process block 131, the method 100 proceeds to decision block 133 to determine if a shear force experienced by the vehicle 10 is greater than zero (0). Shear force may be a mathematical summation of multiple forces experienced during operation of the electric scooter 10, such as a first shear force generated by the user's push-off "scooting" motion and a second shear force caused by the vehicle 10 sliding on a declined surface due to gravity. In response to a determination that the shear force is not greater than zero (block 133=NO), the adaptive propulsion assist system 14 may thereafter return to input/output block 103 and loop back through method 100.

However, if the shear force is in fact greater than zero (block 133=YES), the method 100 determines if the vehicle's current speed is greater than the memory-stored preset cruise speed, as indicated at decision block 135. If it is not (block 135=NO), system 14 may thereafter return to input/output block 103. If, on the other hand, the vehicle's current speed is greater than the memory-stored preset cruise speed (block 135=YES), the method 100 proceeds to process block 137, sets the memory-stored cruise speed to coincide with the current vehicle speed, and then loops back to input/output block 103.

Upon determining that the pitch angle is less than the second calibrated threshold angle (block 129=YES), the adaptive propulsion assist system 14 concludes that the vehicle 10 is on a not-insubstantial decline and therefore proceeds to process block 139. At process block 139, the vehicle controller 18 determines an incline force component experienced by the vehicle 10 due to the pitch angle of the declined surface. Vehicle controller 18 concomitantly subtracts the net force from the incline force component. At decision block 141, the method determines if the difference between the net force and this force component is greater than zero. If it is (block 141=YES), the method 100 loops from decision block 141 back to process block 131 and continues as described above through operations 133, 135, 137, etc. Conversely, if the resident vehicle controller 18 determines that the difference between the net force and the force component is not greater than zero (block 141=YES), the method 100 loops from decision block 141 back to input/output block 119 and continues as described above through operations 121, 123, 125, etc.

Deriving a pitch angle/roadway grade at predefined process block 127 may be accomplished using any of a number of different available techniques. In one example, the resident vehicle controller 18 processes the accelerometer-generated sensor signals to derive the vehicle's current acceleration components, namely forward acceleration $a_x$, transverse acceleration $a_y$, and vertical acceleration $a_z$. Using these acceleration values, vehicle controller 18 calculates an initial angle input and its sign (+/−) as atan $2(a_z, a_x)$, the two-argument arctangent function of the vertical (up-down) and forward (fore-aft) acceleration components. Note, if the vertical acceleration component $a_z$ is approximately equal to gravity (9.806 m/s$^2$), then the initial angle input is zero. For non-zero initial angle inputs, the vehicle controller 18 multiplies angular pitch speed q(Y) (i.e., the change in pitch angle as a function of time) by a predetermined amount of time. Controller 18 thereafter modifies the initial angle input based on the calculated change in pitch angle. In other words, the vehicle controller 18 determines a delta angle from a current angular velocity of the manually powered vehicle about a pitch axis that is both horizontal relative to the surface on which the manually powered vehicle moves and orthogonal relative to a direction of travel of the manually powered vehicle. Vehicle controller 18 thereafter adds/subtracts the initial angle input from the delta angle, and calculates a final pitch angle value as the mathematical difference/sum of the initial angle and delta angle. This final pitch angle value is thereafter used to identify the calibrated force gain increment.

Another technique that may be used to derive pitch angle/roadway grade at predefined process block 127 includes the resident vehicle controller 18 processing the accelerometer-generated sensor signals to derive the vehicle's current acceleration. These acceleration components are then used to calculate an initial angle input (without a sign) as an absolute value of an arccos($a_z/g$), the inverse trigonometric cosine function of the vertical acceleration component $a_z$ and gravity g (9.81). The vehicle controller 18 contemporaneously identifies a direction of the net force $F_{net}$ as atan $2(F_{net,z}, F_{net,x})$, the two-argument arctangent function of the net force vertical component $F_{net,z}$ and the net force fore-aft component $F_{net,x}$. A final pitch angle value is then determined by assigning a pitch angle sign to the absolute value of the initial angle based on the net force direction. This final pitch angle value is thereafter used to identify the calibrated force gain increment.

The load assist mode described above may be modified to compensate for variations in surface grade. In an example, the resident vehicle controller 18 measures a net force fore-aft magnitude component ("X force") FM as the summation of a fore-aft deck force component $F_{D,x}$ and a fore-aft handlebar force component $F_{H,x}$. The vehicle controller 18 concurrently estimates a grade angle of the surface along which the vehicle 10 is travelling, e.g., as described above. The vehicle controller 18 then determines if the net force fore-aft magnitude component FM exceeds an expected force value resulting from the surface slope. If not, the vehicle controller 18 may loop back and continue to monitor net force fore-aft magnitude FM during subsequent use of the electric scooter 10. However, upon determining that the net force fore-aft magnitude component FM does exceed the expected force value, the vehicle controller 18 responsively increases e-assist motor torque output based on a difference between the applied force and the force attributable to grade.

As another option, load assist mode may modify motor output to compensate for variations in surface grade using time-series data to filter grade effects (e.g., using X-direction forces only). In this example, the vehicle controller 18 measures net force $F_{net}$ and estimates pitch angle in any of the manners described herein. A first-order lag filter is calculated as:

$$\frac{F_{net}}{\alpha_{net}} = k \times \frac{F_{net_{raw}}}{\alpha_{net_{raw}}} + (1-k) \times \frac{F_{net_{old}}}{\alpha_{net_{old}}}$$

where $F_{net_{raw}}$ is a resultant force, e.g., as read by in-vehicle handlebar and deck sensors; $\alpha_{net}$ is an adjusted vehicle acceleration using a low pass filter; $\alpha_{net_{raw}}$ is a vehicle acceleration, as read by an in-vehicle accelerometer; $\alpha_{net_{old}}$ is a previous adjusted vehicle acceleration; k is a; $F_{net_{old}}$ is a previous adjusted resultant force; and s is a sensibility factor used to adjust for sensibility (i.e., a small s equals a higher sensibility). The controller thereafter determines if:

$$\frac{F_{net}}{\alpha_{net}} \gg \frac{F_{net_{old}}}{\alpha_{net_{old}}} \times \frac{k}{s}$$

If so, the resident vehicle controller 18 transmits a command signal to the traction motor 16 to increase e-assist torque based on a proportionality difference.

Figure 4:
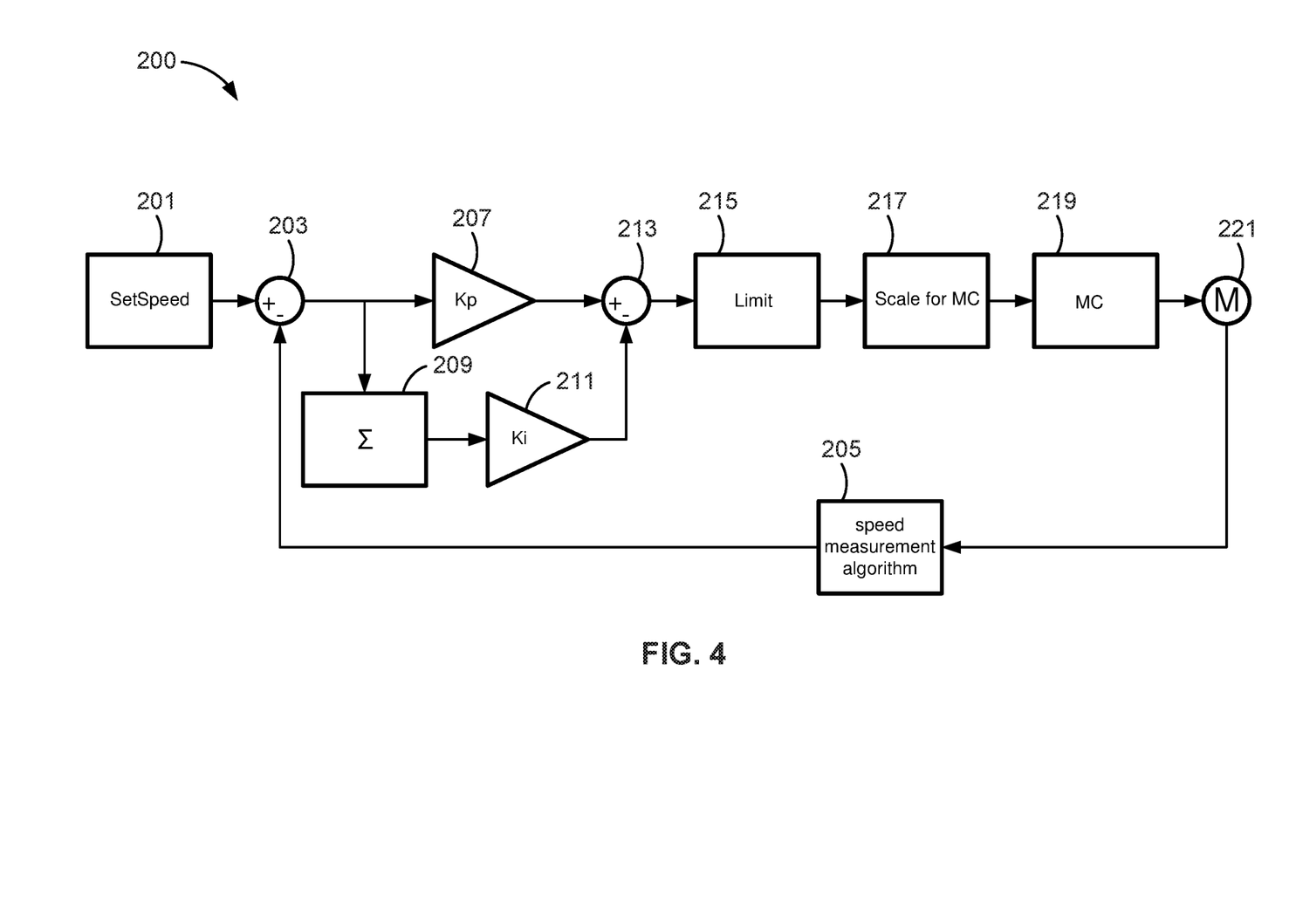
FIG. 4 is a flowchart illustrating a representative proportional-integral (PI) control algorithm for modifying e-assist power output of a traction motor, which may correspond to memory-stored instructions executed by onboard or remote control-logic circuitry, programmable electronic control unit, or other computer-based device or network of devices in accord with aspects of the disclosed concepts.

Turning next to FIG. 4, there is shown a representative proportional-integral (PI) control algorithm 200 for modifying e-assist power output of a traction motor, such as power assist traction motor 16 of FIGS. 1 and 2. In general, the resident vehicle controller 18 reads a memory-stored preset cruise speed and, based on a maximum limit imposed by a memory-stored table calibration (e.g., dependent upon on grade angle), the vehicle controller calls-up a proportional-integral-derivative (PID) module to identify a current motor speed for that same value. The vehicle controller 18, implementing the PID module, then completes a comparison between a measured actual vehicle speed and a desired vehicle speed, and adjusts the gain values within the constraints of the look up table. In the illustrated example, a set speed (e.g., memory-stored vehicle cruise speed) is determined at process block 201 as the desired process value or setpoint (SP). This input reference value is evaluated at first summing unit 203, which in this case computes a difference between the set speed and a measured speed value. This measured speed value may be calculated at process block 205 using sensor feedback from a Hall sensor or an interrupt-based input wheel hub sensor (e.g., 2x per revolution), and modulating for glitch detection and filtered output speed.

Once evaluated, the deviation is inputted into the P-part controller 207 having transfer function Kp and into the I-part controller 211 having transfer function Ki. The output signal Σ of the summing unit 203 represents the sum of these two speed signals, determined at process block 209, which is subsequently inputted into the I-part controller 211. The output values of the P-part and I-part controllers 207, 211 are evaluated at second summing unit 213. The control algorithm 200 of FIG. 4 also includes a speed limiter 215 connected in series with the second summing unit 213. The speed limiter 215 may generate a limiting input speed reference signal for a closed-loop speed system. A scale coefficient reduction unit 217 applies a scale coefficient Kr<1 in order to generate a reduced motor control (MC) speed signal. A final MC signal is processed at 219 and output to the traction motor (M) at 221.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other suitable integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other suitable processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for regulating a propulsion assist system of a manually powered vehicle, the manually powered vehicle including a frame with a handlebar and multiple wheels attached to the frame, the propulsion assist system including a vehicle controller and a traction motor attached to the frame, the traction motor being operable to drive one or more of the wheels, the method comprising:
    detecting, via the vehicle controller, a user contacting the manually powered vehicle;
    receiving, via the vehicle controller responsive to the vehicle controller detecting the user contacting the manually powered vehicle, a handlebar sensor signal from a handlebar sensor attached to the handlebar, the handlebar sensor signal being indicative of a handlebar force applied by the user to the handlebar;
    determining a net force applied by the user to the manually powered vehicle based on the handlebar force;
    receiving, via the vehicle controller from an accelerometer mounted to the frame, an acceleration sensor signal indicative of an acceleration of the manually powered vehicle;
    determining a pitch angle of a surface on which the manually powered vehicle moves based on the acceleration of the manually powered vehicle; and
    transmitting, via the vehicle controller responsive to the vehicle controller determining that the net force is greater than zero and the pitch angle is greater than a calibrated threshold angle, a command signal to the traction motor to increase a motor torque output by a calibrated force gain increment.

2. The method of claim 1, further comprising receiving, via the vehicle controller responsive to the vehicle controller detecting the user contacting the manually powered vehicle, a deck sensor signal from a deck sensor mounted to a scooter deck of the frame, the deck sensor signal being indicative of a deck force applied by the user to the scooter deck, wherein determining the net force is further based on the deck force.

3. The method of claim 1, wherein detecting the user contacting the manually powered vehicle includes the vehicle controller receiving a contact sensor signal from a contact sensor mounted to the handlebar.

4. The method of claim 1, wherein the manually powered vehicle further includes an inertial measurement unit (IMU), the accelerometer is a multi-axis accelerometer integrated into the IMU, and the acceleration sensor signal includes sensor signals indicative of a vertical acceleration component and a horizontal acceleration component.

5. The method of claim 1, further comprising transmitting, via the vehicle controller responsive to not detecting the user contacting the manually powered vehicle, a stop command signal to the traction motor to discontinue generating the motor torque output.

6. The method of claim 1, further comprising:
    receiving, via the vehicle controller from a brake input device, a brake signal indicative of a brake input generated by the user to stop the manually powered vehicle; and
    transmitting, via the vehicle controller responsive to receiving the brake input, a stop command signal to the traction motor to discontinue generating the motor torque output.

7. The method of claim 1, further comprising, responsive to the net force not being greater than zero:
    determining a current vehicle speed of the manually powered vehicle;
    determining if the current vehicle speed is less than a preset cruise speed; and
    transmitting, via the vehicle controller responsive to the current vehicle speed being less than the preset cruise speed, a boost command signal to the traction motor to increase the motor torque output by a Proportional-Integral (PI) control value.

8. The method of claim 7, further comprising transmitting, via the vehicle controller responsive to the current vehicle speed being greater than the preset cruise speed, a cut command signal to the traction motor to decrease the motor torque output by the PI control value.

9. The method of claim 1, further comprising, responsive to the pitch angle being less than a second calibrated threshold angle:
    determining a force component due to the pitch angle of the surface;
    determining if a difference between the net force and the force component is greater than zero; and
    transmitting, via the vehicle controller responsive to the difference between the net force and the force component being greater than zero, the command signal to the traction motor to increase the motor torque output by the calibrated force gain increment.

10. The method of claim 9, further comprising, responsive to the difference between the net force and the force component not being greater than zero:
    determining a current vehicle speed of the manually powered vehicle;
    determining if the current vehicle speed is less than a preset cruise speed; and
    transmitting, via the vehicle controller responsive to the current vehicle speed being less than the preset cruise speed, a boost command signal to the traction motor to increase the motor torque output by a Proportional-Integral (PI) control value.

11. The method of claim 1, further comprising, subsequent to transmitting the command signal to increase the motor torque output:
   determining a shear force applied to the manually powered vehicle;
   determining if the shear force is greater than zero;
   determining, via the vehicle controller responsive to the shear force being greater than zero, if a current vehicle speed is greater than a preset cruise speed; and
   modifying, via the vehicle controller responsive to the current vehicle speed being greater than the preset cruise speed, the preset cruise speed to equal the current vehicle speed.

12. The method of claim 1, wherein the acceleration sensor signal includes sensor signals indicative of a vertical acceleration component and a horizontal acceleration component, and wherein determining the pitch angle includes:
   calculating an initial angle as an atan 2 function of the vertical and horizontal acceleration components;
   determining a delta angle from an angular velocity of the manually powered vehicle about a pitch axis horizontal relative to the surface on which the manually powered vehicle moves and orthogonal relative to a direction of travel of the manually powered vehicle; and
   calculating the pitch angle as a mathematical difference or sum of the initial angle and the delta angle.

13. The method of claim 1, wherein the acceleration sensor signal includes sensor signals indicative of a vertical acceleration component, and wherein determining the pitch angle includes:
   calculating an initial angle as an absolute value of an arccos function of the vertical acceleration component and gravity;
   determining a force direction of the net force applied by the user to the manually powered vehicle; and
   determining the pitch angle by assigning a pitch angle sign to the absolute value of the initial angle based on the force direction.

14. The method of claim 1, further comprising retrieving the calibrated force gain increment from a memory-stored look-up table correlating pitch angle to force gain.

15. An electric scooter comprising:
   a vehicle frame with a scooter deck configured to support thereon a standing user;
   a handlebar attached to the vehicle frame and configured to be manually operated by the user;
   a plurality of ground wheels rotatably attached to the vehicle frame;
   a traction battery pack mounted to the vehicle frame;
   a traction motor mounted to the vehicle frame and electrically connected to the traction battery pack, the traction motor being configured to selectively impart assist torque to drive one or more of the ground wheels; and
   a vehicle controller mounted to the vehicle frame and operatively connected to the traction motor, the vehicle controller being programmed to:
     detect a user contacting the electric scooter;
     responsive to the vehicle controller detecting the user contacting the electric scooter, receive a handlebar sensor signal from a handlebar sensor attached to the handlebar, the handlebar sensor signal being indicative of a handlebar force applied by the user to the handlebar;
     determine a net force applied by the user to the electric scooter based on the handlebar force;
     receive, from an accelerometer mounted to the frame, an acceleration sensor signal indicative of an acceleration of the electric scooter;
     determine a pitch angle of a surface on which the electric scooter moves based on the acceleration of the electric scooter; and
     responsive to the vehicle controller determining the net force is greater than zero and the pitch angle is greater than a calibrated threshold angle, transmit a command signal to the traction motor to increase a motor torque output by a calibrated force gain increment.

16. The electric scooter of claim 15, wherein the vehicle controller is further programmed to receive, responsive to the user contacting the electric scooter, a deck sensor signal from a deck sensor mounted to the scooter deck, the deck sensor signal being indicative of a deck force applied by the user to the scooter deck, wherein determining the net force is further based on the deck force.

17. The electric scooter of claim 15, wherein the vehicle controller is further programmed to transmit, responsive to not detecting the user contacting the electric scooter, a stop command signal to the traction motor to eliminate the motor torque output.

18. The electric scooter of claim 15, wherein the vehicle controller is further programmed to:
   receive a brake signal from a brake input device indicative of a brake input generated by the user to stop the electric scooter; and
   responsive to receiving the brake input, transmit a stop command signal to the traction motor to eliminate the motor torque output.

19. The electric scooter of claim 15, wherein the vehicle controller is further programmed to, responsive to the net force not being greater than zero:
   determine a current vehicle speed of the electric scooter;
   determine if the current vehicle speed is less than a preset cruise speed; and
   responsive to the current vehicle speed being less than the preset cruise speed, transmit a boost command signal to the traction motor to increase the motor torque output by a Proportional-Integral (PI) control value.

20. The electric scooter of claim 15, wherein the vehicle controller is further programmed to, responsive to the net force not being greater than zero:
   determine a force component due to the pitch angle of the surface;
   determine if a difference between the net force and the force component is greater than zero; and
   responsive to the difference between the net force and the force component being greater than zero, transmit the command signal to the traction motor to increase the motor torque output by the calibrated force gain increment.

* * * * *